3,210,402
PRODUCTION OF UNSATURATED ESTERS

Jay K. Kochi, Berkeley, Calif., assignor to Shell Oil Company, New York, N.Y., a corporation of Delaware
No Drawing. Filed Dec. 20, 1961, Ser. No. 160,890
7 Claims. (Cl. 260—476)

This invention relates to the synthesis of carboxylic acid esters of ethylenic alcohols and deals with a new and advantageous method of producing these compounds from conjugated dienes and peroxides.

When dienes are reacted in the presence of organic peroxides the products are usually high molecular weight polymers of the dienes. With special types of cyclic peroxides in the presence of redox reducing agents, diene polymerization can be minimized. The products obtained in such cases correspond to dimers of a free radical formed by addition to the diene of a radical produced by simultaneous breakage of the peroxy oxygen-to-oxygen bond and opening of the ring of the cyclic peroxide. In this way unsaturated esters can be produced as described in Smith Patent U.S. 2,820,813 for example. While this method is quite useful, it is limited with respect to the particular products which can be obtained not only by the nature of the starting cyclic peroxides which can be used in the process, but also by the fact that the mechanism of the reaction inherently restricts it to production of compounds which contain two units of starting peroxide and two units of diene per molecule as predominant products.

An important object of the present invention is the provision of a method for producing carboxylic acid esters of ethylenic alcohols which is not subject to the foregoing disadvantages and which is capable of greater flexibility in regard to the structure of the final product. A more particular object is to provide a method for synthesizing carboxylic acid esters of ethylenic alcohols in which products with only one unit of diene per molecule or a plurality of units of diene not greater than four per molecule can be made. One special object is the provision of a method for the manufacture of esters of ethylenic diols from conjugated dienes and carbonylic peroxides. Another special object is to provide a method for producing esters of substituted ethylenic alcohols, particularly carboxylic acid esters of ethylenic alcohols containing halogen or amine, nitrile, ether, thioether and like substituent groups. Still other objects and advantages of the invention will be apparent from the following description in which some of the advantageous modifications of the new process will be given by way of illustration but without any intent to limit the invention thereto.

It has been found that by using a carbonyl-containing peroxide, a class of peroxides herein after referred to as carbonylic peroxides and an acyclic, aliphatic, conjugated diene for the reaction and employing copper salt in the reaction mixture, addition of an acyloxy radical from the peroxide to the diene can be effected without substantial polymerization of the diene beyond the tetramer stage. The products will be mixtures of esters because, as is usual in addition reactions of dienes, both 1,2-addition and 1,4-addition will take place. Depending upon the amount of copper salt maintained in the reaction mixture, the product will be composed essentially entirely of esters containing only one unit of diene per molecule or mixtures of esters containing a plurality of diene units up to about four per molecule.

In an especially advantageous modification of the invention, the new reaction is carried out as a controlled telomerization process in which the carbonylic peroxide is the telogen and the diene is the taxogen, using these terms as defined in U.S. Patent 2,398,426 for example.

The formation of telomers in this way by reacting the preferred type of carbonylic peroxide with diene hydrocarbons of the formula $C_nH_{2n-4}RR'$ for example can be represented by the equation:

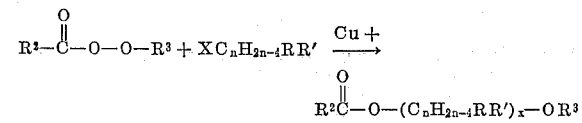

where
R and R' represent the same or different members of the group consisting of hydrogen, halogen, and hydrocarbon radicals,
$R^2$ represents hydrogen or a hydrocarbon radical
$R^3$ represents hydrogen or a hydrocarbon radical or a carbonyl group, e.g.,

$x$ is an integer equal to 1 to 4 which represents the number of diene units in the ester product. This reaction takes place by an entirely different mechanism from that involved in the previously mentioned reactions between cyclic peroxides and dienes, with the result that different types of products are obtained. The new reaction of the invention can be formulated as occurring via the following steps:

(a) Reaction of the carbonylic peroxide with copper salt to form a copper salt of a carboxylic acid and an oxy free-radical;

(b) Addition of the oxy free-radical to the diene;
$C_nH_{2n-4}RR' + \cdot OR^3 \rightarrow [\cdot C_nH_{2n-4}RR'\text{---}OR^3]$ (c) Redox reaction of the allylic free-radical formed in (b) with the copper salt produced in (a)

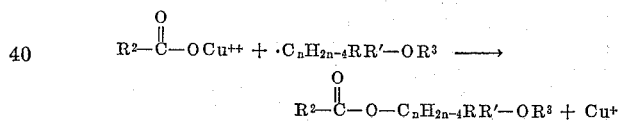

This last reaction (c) competes with a chain propagation reaction (d) of the allylic free-radical with the conjugated diene $YC_nH_{2n-4}RR' + C_nH_{2n-4}RR'\text{---}OR^3 \rightarrow$
$\cdot(C_nH_{2n-4}RR')_{Y+1}\text{---}OR^3$ This reaction chain will also be terminated by reaction (e) with the copper salt

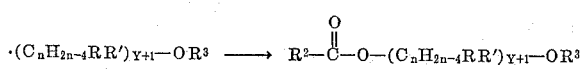

By varying the diene and copper salt concentrations in the reaction mixture, the number of diene units in the product ester can be controlled so that the more advantageous esters of the above formula in which Y is equal to zero to three are the predominant products of the reaction.

The reaction can be carired out with any carbonylic peroxide, that is to say, with any peroxycarboxylic acid, peroxycarboxylic acid ester, peroxycarboxylic acid salt or peroxycarboxylic acid anhydride. The different types of telomers which are obtained by addition of one mole of these telogens to one mole of butadiene, for instance, are as follows:

2-acyloxy-3-butene-1-ols and 4-acyloxy-2-butene-1-ols from peroxycarboxylic acids or their salts by 1,2- and 1,4-addition, respectively, 3-acyloxy-4-alkoxybutene-1 and 1-acyloxy-4-alkoxybutene-2-from alkyl esters of peroxycarboxylic acids by 1,2- and 1,4-addition, respectively, and 3,4-di(acyloxy)butene-1 and 1,4-di(acyloxy)butene-2 from dicarboxylic peroxides of the peroxycarboxylic acid anhydride type by 1,2- and 1,4-addition, respectively.

There are special advantages in using as the carbonylic peroxides in the new process those of the above formula in which R³ is a hydrocarbon radical or carbonyl group such as

Particularly useful telogens are the percarboxylic acid anhydrides of the formula

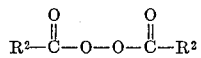

in which each R² represents a hydrocarbon or halohydrocarbon group, which gorup can be the same or different, since the diesters which result are especially valuable products. Thus, for example, as adducts of equal moles of acetyl peroxide and butadiene, that is 1:1 adducts, that are obtained 3,4-di(acetyloxy)butene-1 and 1,4-di(acetyloxy)butene-2 while with a smaller proportion of copper ion present, the 1:2 adducts of one mole of acetyl peroxide with two moles of butadiene which are mixtures of isomeric di(acetyloxy)octadienes are obtained. Preferred dicarbonylic peroxides for the reaction are those having 1 to about 18 carbon atoms in the carbonyl groups

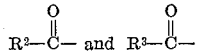

which may be the same or different. For intsance, by the use of acetyl benzoyl peroxide with butadiene, one obtains as 1:1 adducts the two isomers formed by 1,2-addition 3-acetyloxy-4-benzoyloxybutene-1 and 3-benzoyloxy-4-acetyloxybutene-1 and the one product resulting from 1,4-addition, namely 1-acetyloxy-4-benzoyloxybutene-2. The 1:2 adducts are a more complex mixture of acetyloxybenzoyloxyoctadienes. Dicarbonylic peroxides

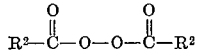

in which each R² is a hydrocarbon or halo-substituted hydrocarbon group, particularly an alkyl or haloalkyl group of 1 to 10 carbon atoms, or a saturated carbocyclic or aryl group, particularly the phenyl group or an alkyl-substituted phenyl group of 7 to 10 carbon atoms, are especially useful. Typical examples of other peroxycarboxylic acid anhydrides useful in the new process are: formyl peroxide, caproyl peroxide, lauroyl peroxide, stearoyl peroxide, formyl propionyl peroxide, tetrahydrobenzoyl peroxide, toluoyl peroxides, naphthoyl peroxides, chloroacetyl peroxide, and the like. U.S. Patents 2,806,045 and 2,813,896 described various peroxycarboxylic acids the corresponding anhydrides of which can be used in making ethylenic esters according to the present invention.

The peroxycarboxylic acid esters form the other especially useful subgroup of starting carbonylic peroxides for use in the new reaction. Those from carboxylic acids having 1 to 18 carbon atoms per molecule are especially preferred because of their ready availability. The esters of both saturated and unsaturated peroxycarboxylic acids can be used, but esters of peroxycarboxylic acids which are free of ethylenic unsaturation are preferred because there is usually less loss through undesirable side reactions with esters of this type. The esters of the alkanoic peracids having 1 to 18 carbon atoms in the acid moiety, especially the lower fatty peracids of 1 to 5 carbon atoms such as the peracetic, perbutyric and perivalic acid esters, and the esters of saturated carbocyclic or aromatic peracids having 7 to 10 carbon atoms in the acid moiety, such for instance as perbenzoic, the pertoluic, cyclohexaneperacetic and the like peracids are particularly suitable. Peroxycarboxylic acid esters described in U.S. 2,608,570, U.S. 2,608,571 and U.S. 2,698,863 for example provide useful starting materials for the present process. The alcohol moiety of the starting peroxycarboxylic acid esters is preferably free of ethylenic unsaturation. Peresters of saturated aliphatic monohydric alcohols of 1 to 18 carbon atoms such, for instance, of methyl, isobutyl, cyclohexyl, lauryl, and stearyl alcohols or of aromatic monohydric alcohols such as benzyl, para-isopropylbenzyl and like alcohols are especially suitable. Typical of the starting peresters is methyl performate, for example, which with butadiene gives a mixture of 3-formyloxy-4-methoxybutene-1 and 1-formyloxy-4-methoxybutene-2 as 1:1 adducts while isomeric formyloxymethoxy-octadienes are the 1:2 adducts.

Peroxycarboxylic acids corresponding to any of the foregoing peroxycarboxylic acid anhydrides or peroxycarboxylic acid esters and including the peroxycarboxylic acids of U.S. Patents 2,806,045 and 2,813,896 can be used as the telogen in the new process. Salts of the peracids can be similarly employed. The preferred peroxycarboxylic acids and salts are those of an alkanoic or haloalkanoic acid of 1 to 18 carbon atoms or of saturated carbocyclic or aromatic carboxylic acids having 7 to 10 carbon atoms per molecule. Typical examples of suitable peralkanoic acids are performic acid, alpha, alpha-dimethyloctanoic acid, lauric acid, perchloroacetic acid, per-trifluoroacetic acid, stearic acid and the like, while typical useful carbocyclic per-acids are cyclohexane performic acid, per-ortho-toluic acid, per-paratertiarybutylbenzoic acid and like peracids. When salts of the peracids are used instead of the free peracids, it is preferable to employ alkali or alkaline earth metal salts rather than salts of heavy metals. Sodium, potassium, calcium and magnesium salts are representative of the salts which can be used.

A wide variety of conjugated dienes can be used in the reaction of the invention. Particularly advantageous are the 1,3-conjugated dienes such, for example, as 1,3-butadiene, 1,3-pentadiene, isoprene, 1,3-cyclohexadiene, 2,3-dimethyl-1,3-butadiene, 2-phenyl-1,3-butadiene, and 1,3-dodecadiene. Dienes having 4 to 12 carbon atoms per molecule are preferred, especially the hydrocarbon dienes of 4 to 10 carbon atoms. However, substituted dienes, particularly the halo-substituted dienes such, for instance, as chloroprene, 2,3-dichloro-1,3-butadiene and 2-fluoro-1,3-butadiene, can be used in the same way as can those containing other non-reactive substituents such as carboxyl, ether, ester, hydroxyl and like groups. Examples of such substituted dienes which are useful in the process are 2,4-pentadienol and its methyl and ethyl ethers, beta-vinyl-acrylic acid, and sorbic acid and their methyl and ethyl esters, for instance. Mixtures of two or more dienes can be used instead of the individual compounds.

The copper ions which must be present in order for the new reaction to take place can be derived from any suitable copper compound. Cuprous or cupric salts soluble in the reaction mixture are convenient sources of the required copper ions. Soluble salts of polybasic acids are generally suitable, examples being the cuprous and cupric sulfates, perchlorates and the like. Copper salts of monobasic acids such as cuprous chloride and the like can also be used as can organic copper salts of which cupric acetate, benzenesulfonate, methanesulfonate and the like are examples.

Under conditions which are otherwise the same, the greater the amount of copper ions present the larger will be the proportion of the simple 1:1 adducts corresponding to addition of one mole of carbonylic peroxide to one mole of diene. These 1:1 adducts are usually the exclusive products of the reaction when about 20 or more milliequivalents of dissolved copper salt per equivalent of carbonylic peroxide is present in the reaction mixture. The products containing a plurality of diene units per mole of combined carbonyl peroxide will generally be of the order of at least 10% by weight of the total when the amount of dissolved copper salt is reduced to about 1 milliequivalent per equivalent of carbonylic peroxide. As a rule at least 0.1 milliequivalent of dissolved copper per equivalent of carbonylic peroxide will be maintained in the reaction mixture. A large excess of dissolved copper can be present without suppressing the desired reaction, but there is usually no advantage in using amounts greater than the minimum requirement for production of 1:1 adducts under the chosen reaction conditions and as a general rule it is preferable not to use more than about 0.6 equivalent per equivalent of carbonylic peroxide.

The proportions of diene to carbonylic peroxide which will be most advantageous to use will vary depending on the nature of the product which it is desired to manufacture, that is on the value desired for the subscript $x$ in the previously given formula for the telomerization products. As a rule it is desirable to use at least one mole of diene per mole of carbonylic peroxide and generally it is advantageous to use a molar excess of diene to peroxide even when 1:1 adducts are desired as the exclusive products. Ordinarily amounts of diene between about 2 and about 100 moles per mole of carbonylic peroxide are suitable but amounts between about 3 and about 15 moles per mole of carbonylic peroxide are preferred.

The reaction is advantageously carried out in a mutual solvent for the reactants and copper salt being used. Inert solvents such as liquid hydrocarbons, halohydrocarbons, and the like are useful in the production of the telomerization products according to the previously given equations. Suitable solvents of this type include liquid aromatic and/or saturated hydrocarbons such as benzene, toluene, hexane, octanes, cyclohexane, etc., and mixtures such as suitable fractions of petroleum or the like. Examples of suitable halohydrocarbons are carbon tetrachloride, chloroxylenes and the like. Depending on the amount of solvent employed, the reaction conditions used and the particular reactants chosen other liquids can function as non-reactive solvents in the new process. These include water, carboxylic acids, carboxylic acid esters, nitriles, etc. Examples are acetic and propionic acids and their methyl, ethyl and like esters, acetonitrile and similar liquids.

The process can also be carried out successfully in the presence of a hydrophylic reagent or Lewis base, which takes part in the reaction, an anion of the Lewis base attaching itself to the diene in place of one of the oxy radicals of the starting carbonylic peroxide. Hydrophylic reagents of this type include alcohols which result in ether-substituted products, mercaptans which result in products with thioether substituents, ammonia, primary or secondary amines which introduce primary, secondary or tertiary amino groups, respectively, into the product, acids which introduce ester groups, cyanides which result in nitrile-substituted products, phosphines which result in substituted phosphines as products, halides which introduce halogen into the product, and similar Lewis bases. The anions of these Lewis bases can be added to the reaction mixture conveniently as anions of the copper salt which is employed. Thus, for example, with pervivalic acid as the carbonylic peroxide and butadiene as the diene in the presence of copper chloride, the products containing one butadiene unit per molecule are 1-chloro-4-pivalyloxybutene-2 and 3-chloro-4-pivolyloxy-butene-1. The same products are obtained when the chloride anions are added to the reaction mixture in combination with another metal for instance as ferrous chloride which will thus provide ferrous ions as a redox reducing agent for the peroxycarboxylic acid. Indeed whenever a peroxycarboxylic acid is used as the carbonylic peroxide in the process of the invention, it is desirable to provide a stoichiometrically equivalent amount of redox reducing agent, preferably a soluble ferrous salt such as ferrous sulfate, for reaction with the peroxycarboxylic acid since lower temperatures of reaction can then be employed.

Previously given equations $a$, $b$ and $c$ then become:

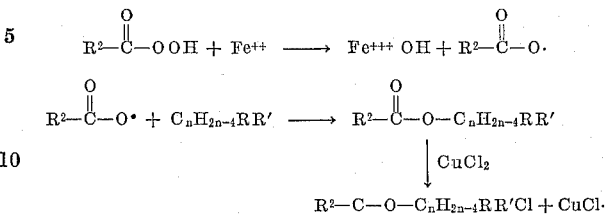

Temperatures of the order of about $-15°$ C. to about $150°$ C., more preferably temperatures in the range of about $50°$ to about $100°$ C. are suitable for the reaction, which is advantageous carried out at a pressure sufficient to maintain a liquid phase present and may be atmospheric or higher or lower pressures. The reaction is relatively rapid at these temperatures, and reaction times of about 1 to 40 hours are usually sufficient for satisfactory conversions and yields of desirable products.

Various methods of carrying out the process of the invention can be employed—continuous, intermittent or batch operation being satisfactory. Since some of the carbonylic peroxides used in the process may be explosive, the customary precautions in handling these compounds must be observed.

Any method of intimately contacting the reactants in the presence of copper ions can be used employing either batch, continuous or intermittent methods of reaction. After completion of the reaction the ester product can be recovered and purified in any suitable way. Extraction with an appropriate solvent for the product is one method which has been found useful. Instead of recovering the esters as such, they can be hydrolyzed and the corresponding alcohols and carboxylic acids can be separately collected. Alternatively, one can subject the ester products to acid exchange, for example, by reaction under acidic conditions with a higher boiling carboxylic acid while distilling off the lower boiling acid produced, and recovering the new ester formed.

The following examples illustrate in more detail suitable methods of carrying out the new process and show some of the advantages of the invention.

*Example I*

A 300 ml. heavy-walled Pyrex polymerization bottle equipped with a thermocouple well and sealed with a Teflon-lined screw cap was charged with a solution of 40 grams (0.3 mole) of tertiary butyl peracetate (80% concentration), 48 grams (1 mole) of butadiene, 100 ml. benzene and 0.203 (1.4 milliequivalent) grams of cuprous bromide and reacted at 80–85° for 30 hours. The crude reaction mixture was homogeneous and yellow indicating that the copper was present mainly in the cuprous state. There was an accompanying 5–7% decrease in the reaction volume. The unreacted butadiene was distilled and an aliquot of the residue titrated for acetic acid potentiometrically. It was also saponified to determine the total ester content. The mixture was then extracted with dilute HCl once and NaHCO₃ solution until neutral. After drying with Na₂SO₄, the mixture was distilled. In several representative reactions 8–10% acetic acid and 90–92% total esters were formed. The material balance represented by the acid and esters produced with the perester charged was within 1–2%. The products were acetic acid (8–10%) tertiary butyl alcohol (approximately 5%) and 90–92% unsaturated esters. Only about 10 grams of polymeric butadiene was produced. Distillation of the ester mixture at 2 mm. mercury pressure yielded two fractions corresponding to a 1:1 adduct (40–50%) and a 1:2 adduct of tertiary-butyl per acetate and butadiene. The esters were separated by gas-liquid chromatography on a 5 foot diethyleneglycol succinate chromosorb W column and the 1:1 adduct esters were identified as 4-tertiary butoxy-1-acetoxybutene-2 (boiling point 42–47° C. at 2 mm., $n_D^{25}$ 1.4268) and 4-tertiary butoxy-3-acetoxybutene-1 (boiling point 55–59° C. at 2 mm., $n_D^{25}$ 1.4341–1.4358). The 1:2 adduct esters were a mixture of four isomeric tertiary butoxy-acetoxyoctadienes. No evidence was found for the formation of teritary-butoxy-acetoxydodecatrienes.

When the process was repeated using toluene as the solvent, similar results were obtained. An over-all yield of 92% esters, 8% acetic acid, and 7% t-butyl alcohol was formed. The ester components on distillation yielded 51% 1:1 adducts in which the 4-t-butoxy-3-acetoxybutene-1 predominated. No benzyl acetate was formed.

*Example II*

The method of Example I was repeated with the apparatus charged with 75 ml. methanol, 41.9 grams (80% benzene solution) t-butyl peracetate, 47 g. butadiene and 0.203 g. cuprous bromide. The crude reaction mixture (colorless) analyzed for 0.044 eq. carbonyl (formaldehyde), 0.070 eq. (27% acetic acid, and 0.19 eq. (73%) total ester. After workup, distillation yielded 0.08 eq. (31%) methyl acetate and 0.031 eq. of formaldehyde (isolated as the methone derivative, M.P. 187–188°). The higher ester fraction (44%) consisted predominantly (approximately 70%) of the t-butoxyacetoxybutenes (82% 4-t-butoxy-3-acetoxybutene-1 and 18% 4-t-butoxy-1-acetoxybutene-2). In addition to the esters there was formed a mixture of t-butoxy- methoxybutenes (72% 4-t-butoxy-3-methoxybutene-1 and 28% 4-t-butoxy-1-methoxybutene-2). The mole ratio of total t-butoxy-butenyl acetates to diethers was 1.64:1. A yield of tert. butoxyacetoxyoctadienes of approximately 20% was also obtained. An insoluble precipitate (0.92 grams) of polybutadiene was isolated which analyzed 87.1% carbon and 10.9% hydrogen.

*Example III*

When the method of Examples I and II was repeated using an excess cupric ion, the formation of 2:1 and higher adducts of butadiene and perester was drastically curbed. Thus, a homogeneous reaction mixture consisting of butadiene (1.0 M.), t-butyl peracetate (0.27 M.), cuprous chloride (3 meq.) and cupric acetate (10 meq.) in 100 ml. acetonitrile yielded a light yellow solution containing only cuprous salts. There was isolated a 70–75% yield of a mixture of 1:1 adducts (butoxy-acetoxybutenes) and 10–15% of 1:2 adducts (butoxy-acetoxyoctadienes). A similar reaction in 50% v. acetic acid-benzene solution consisted of butadiene (1.0 M.), t-butyl peracetate (0.27 M.), cuprous chloride (3 meq.) and cupric acetate (10 meq.). The reaction mixture after heating appeared dark green which indicated that cupric acetate was still present. Distillation yielded only a mixture of 1:1 adducts (butoxy-acetoxybutenes) in 90–95% yield. In neither system was a significant amount (<0.5 g.) of polymeric butadiene formed.

The distribution of the isomeric 1:1 adducts, 4-t-butoxy-3-acetoxybutene-1 and 4-t-butoxy-1-acetoxybutene-2, in the product mixture was insensitive to solvent variation, although the over-all yields of the 1:1 adducts varied considerably. Thus, the percentage of the major isomer, 4-t-butoxy-3-acetoxybutene-1, constituted in the 1:1 adduct mixtures was 78–83% in benzene, 84% in toluene, 83% in methanol, 82% in acetonitrile and 81% in 50% v. acetic acid-benzene.

*Example IV*

A solution of 40 g. t-butyl perbenzoate, 46 g. butadiene, and 100 ml. benzene with 0.203 g. cuprous bromide was reacted at 75–85° for 24 hours in sealed tubes. The light yellow solution was distilled to remove the unreacted butadiene and extracted to remove the benzoic acid (1.3 g.). An aliquot of the resulting solution was saponified (total ester 0.175 eq., 85%), dried ($Na_2SO_4$) and distilled to remove volatile materials and then vacuum distilled (1 mm.).

t-Butyl perbenzoate reacted with the butadiene in the benzene solution to yield 85% of mixed esters, 13% benzoic acid and 14% t-butyl alcohol. The mixed esters were fractionated into a 1:1 adduct mixture of t-butoxy-benzoxybutenes (60–65%), 2:1 adducts benzoxy-t-butoxyoctadienes (15–20%) and higher molecular weight esters (5–10%). The 1:1 adduct mixture consisted primarily of the 1,2 adduct, 4-t-butoxy-3-benzoxybutene-1.

*Example V*

A mixture of benzene (200 ml.), isoprene (75 ml.), 20.2 g. t-butyl perbenzoate, and 0.212 g. cuprous bromide in a three-neck round-bottom flask was maintained under pressure (200 mm.) at 68–70° for 50 hours. As the reaction progressed, the cuprous chloride went into solution and the mixture became bluer. The blue reaction mixture was extracted with dilute HCl and $NaHCO_3$. Benzoic acid did not precipitate on acidification of the $NaHCO_3$ washes. Distillation yielded 18 g. of material boiling at 106–109°/1. mm.; $n_D^{25}$ 1.4908–1.4893; 3.6 g. boiling at 113–125°/1. mm., $n_D^{25}$ 1.4932–1.5040; and 2.2 g. of undistilled residue ($n_D^{25}$ 1.5172). The distilled fractions each analyzed for the 1:1 adduct t-butoxybenzoxypentene.

*Anal.*—Calcd.: C, 73.25; H, 8.45; ester value, 0.382, bromine No. 61. Found: C, 73.3, 73.3; H, 8.4, 8.3; ester value, 0.394; bromine number 59, 62.

This represents an 81% yield of the mixture of 1:1 adducts. The structures correspond to the four possible isomeric tert. butoxybenzoxypentenes analogous to the butadiene adducts. The infrared spectrum of the lower boiling isomer exhibited distinctive bands at 10.1 (m), 10.85 (ms), 11.3 (ms), and 11.75 (m) $\mu$, which indicate it to be probably a mixture of the 1,2- and 4,3-addition products 4-t-butoxy-3-benzoxy-2-methylbutene-1 and 4-t-butoxy-3-acetoxy-3-methylbutene-1. The higher boiling component showed bands in the infrared spectrum at 10.6 (m) and 11.2 (m) $\mu$ and is probably a mixture containing the 1,4- and 4,1- addition products of t-butyl perbenzoate to isoprene, namely 2-methyl-1-benzoxy-4-tert. butoxybutene-2 and 2-methyl-4-benzoxy-1-tert. butoxybutene-2-. Less than 5% of higher adducts and no polymeric isoprene were formed.

*Example VI*

When chloroprene is reacted with tertiary butyl perbenzoate in the same way there is obtained a 1:1 adduct mixture in which the main isomers were the products of 1,2-addition 2-chloro-2-benzoxy-1-tert. butoxybutene-3 and of 4,3-addition 3-chloro-2-benzoxy-1-tert. butoxybutene-3 with smaller amounts of the two isomeric products of 1,4-addition, namely 2-chloro-1-benzoxy-4-tert. butoxybutene-2 and 2-chloro-1-tert. butoxy-4-benzoxybutene-2. Only a small amount of 1:2 adduct is formed under these conditions.

*Example VII*

When methyl permonochloroacetate is reacted with butadiene in the same way the 1:1 adducts are 3-monochloro-acetoxy - 4 - methoxybutene-1 and 1-monochloroacetoxy-4-methoxybutene-2 and the 1:2 adducts are isomeric monochloroacetoxy-methoxy-octadienes.

*Example VIII*

When benzoyl peroxide is substituted for the tertiary butyl perbenzoate in the process of Example IV the 1:1 adducts of benzoyl peroxide and butadiene are 1,2-dibenzoxybutene-3 from 1,2-addition and 1,4-dibenzoxybutene-2 from 1,4-addition of the peroxide to the diene. The 1:2 adducts are isomeric dibenzoxyoctadienes. Very little higher adducts or butadiene polymer is produced under these conditions.

Example IX

Using the same reaction conditions for the reaction of acetyl peroxide with isoprene in the presence of about 2 milliequivalents of cupric sulfate, the three isomers 1,2-diacetoxy-2-methyl-butene-3; 3,4-diacetoxy - 2 - methyl-butene-1 and 1,4-diacetoxy-2-methyl butene-2 are obtained as the 1:1 adducts together with a smaller amount of 1:2 adducts which are isomeric diacetoxyoctadienes.

Example X

By reacting acetyl benzoyl peroxide with chloroprene in the presence of cuprous acetate according to the method of Example IV there are obtained a mixture of acetoxy-benzoxychloro-butenes which are 1:1 adducts analogous to those produced by the method of Example VI except that they have acetoxy or benzoxy groups in place of the tertiary butoxy groups. A small amount of acetoxy benzoxyoctadiene isomers is also obtained as 1:2 adduct of the peroxide with the chloroprene.

Example XI

Reacting in the apparatus of Example I using 64 grams (0.54 mole) of perpivalic acid, 200 grams butadiene, 600 ml. methanol and a solution of 100 grams ferrous sulfate and 40 grams cupric sulfate in 400 ml. water and stirring for about two hours at 0° C., there is obtained on work up of the products as adducts containing one mole of butadiene per molecule, 4-pivalyloxy-3-methoxy-butene-1 and 4-pivalyloxy-1-methoxybutene-2 together with pivalyloxymethoxyoctadienes which isomers containing two moles of butadiene per molecule.

The same reaction can be carried out without the ferrous sulfate by using a higher temperature.

Example XII

When perpivalic acid is reacted with butadiene and cupric chloride by charging the reactor with 57 grams of butadiene, 17 grams $CuCl_2 \cdot 2H_2O$ and 25 ml. concentrated hydrochloric acid dissolved in 200 ml. methanol then simultaneously adding with stirring at 0° C., 39 grams (0.33 mole) of perpivalic acid in 50 ml. methanol and 60 grams ferrous chloride in 80 ml. of water, chloropivalyloxy-butenes are obtained as the chief products. Methanolysis of these products using silver trifluoroacetate in methanol yields the same pivalyloxy-methoxybutenes as are obtained in the process of Example XI.

The foregoing examples are merely illustrative, the invention being broadly applicable to the reaction of carbonylic peroxides which have the peroxy oxygen group directly linked to a carbonylcarbon atom with conjugated diene compounds generally in the presence of copper ions. While the reactions of the preferred unsubstituted and halosubstituted carbonylic peroxides and dienes have been emphasized it is to be understood that the invention is not limited thereto and that the new process can be successfully carried out using peroxides and dienes which contain other substituents which are less reactive under the conditions used than the peroxy group of the peroxide and the ethylenic unsaturation of the diene such, for example, as nitro, cyano, sulfone, carboxylic acid, ester and ether groups or the like. Still other variations in the process can be made without departing from the invention which is not limited to the methods of operation given by way of example nor by any theory proposed in explanation of the advantageous results which are obtained.

I claim as my invention:

1. A process for producing an ester of the formula

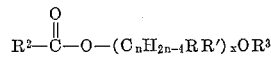

which comprises reacting a peroxide of the formula

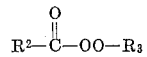

with a conjugated diene of the formula $C_nH_{2n-4}RR'$ in the presence of at least 0.1 milliequivalent but not more than about 0.6 equivalent of dissolved copper per equivalent of said carbonylic peroxides where R and R' represent members of the group consisting of hydrogen, halogen, and hydrocrabon radicals, $R^2$ represent a member of the group consisting of hydrogen and hydrocarbon radicals, $R^3$ represents a member of the group consisting of hydrogen, hydrocarbon radical, and carbonyl radicals of the formula

and $x$ is an integer equal to 1 to 4.

2. A process in accordance with claim 1 wherein the reaction is carried out in the presence of an alcohol which takes part in the reaction and forms an ether-substituted product.

3. A process in accordance with claim 1 wherein a carboxylic acid ester of a chloro-substituted alcohol is produced by reacting in the presence of hydrochloric acid copper chloride and ferrous chloride.

4. A process in accordance with claim 1 wherein a diester of an ethylenic diol is produced by using a percarboxylic acid anhydride as the peroxide reacted with the diene.

5. A process in accordance with claim 1 wherein the peroxide is an ester of a peroxycarboxylic acid having 1 to 18 carbon atoms per molecule.

6. A process in accordance with claim 1 wherein the peroxide reacted is derived from alkanoic acid having 1 to 18 carbon atoms per molecule.

7. A process in accordance with claim 1 in which benzoxy-alkoxy butene is produced by reacting butadiene with a lower alkyl ester of perbenzoic acid.

References Cited by the Examiner

UNITED STATES PATENTS 2,820,813   1/58   Smith _____ 260—497
3,049,557   8/62   Emrick _____ 260—497

OTHER REFERENCES

Cram et al.: Organic Chemistry (New York, 1959), pages 417–8.

Fuson: Advanced Organic Chemistry (New Jersey, 1956), pages 315–18.

Hawkins: Organic Peroxides (London, 1961), pages 315, 313 and 282–3.

Kharasch et al.: J. Org. Chem., Vol. 24, pages 606–14 (1959).

LORRAINE A. WEINBERGER, *Primary Examiner.*

DURAL McCUTCHEN, *Examiner.*